N. RINFRETT.
ANTISKIDDING DEVICE.
APPLICATION FILED MAY 25, 1916.
1,217,999.
Patented Mar. 6, 1917.
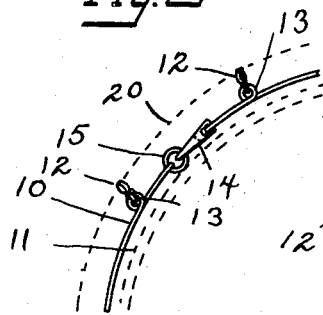
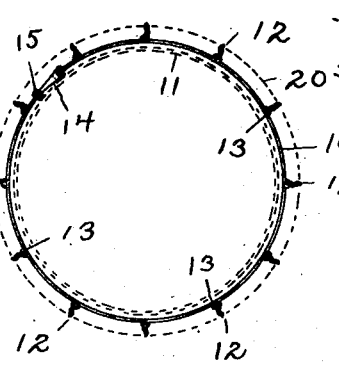
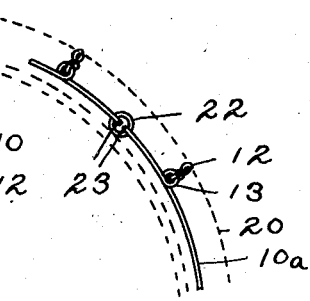
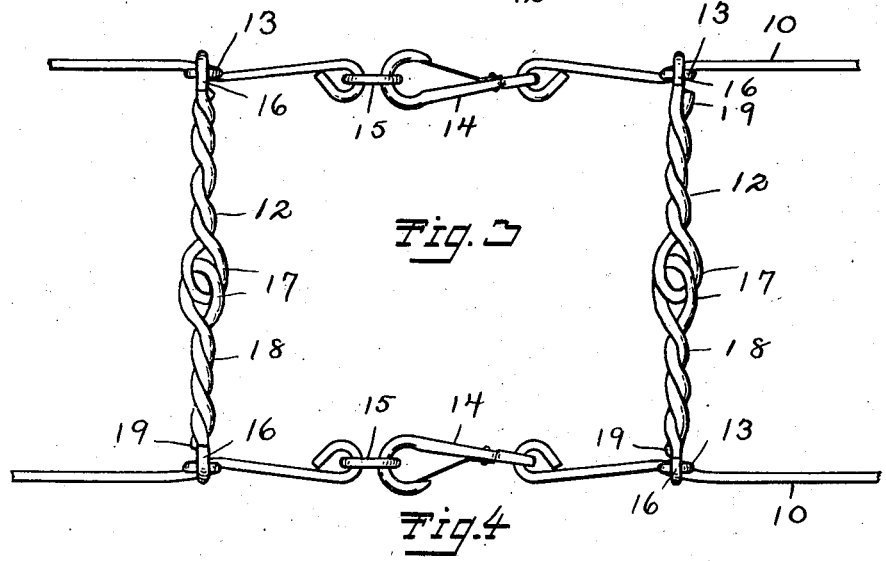
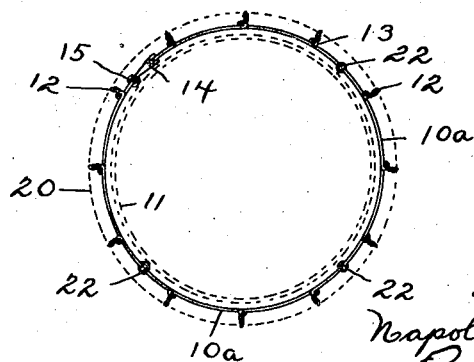
Inventor:
Napoleon Rinfrett.
By Louis M. Schmidt
Atty.

UNITED STATES PATENT OFFICE.

NAPOLEON RINFRETT, OF SOUTHINGTON, CONNECTICUT, ASSIGNOR OF ONE-HALF TO ALBERT R. THOMSON, OF PLANTSVILLE, CONNECTICUT.

ANTISKIDDING DEVICE.

1,217,999.

Specification of Letters Patent.

Patented Mar. 6, 1917.

Application filed May 25, 1916. Serial No. 99,718.

*To all whom it may concern:*

Be it known that I, NAPOLEON RINFRETT, a citizen of the United States, residing at Southington, in the county of Hartford and State of Connecticut, have invented certain new and useful Improvements in Antiskidding Devices, of which the following is a specification.

My invention relates to improvements in anti-skidding devices, for use on automobile tires, and the object of my improvement is simplicity and economy in construction and convenience and efficiency in use.

In the accompanying drawing:—

Figure 1 is a side elevation of my improved anti-skidding device.

Fig. 2 is a similar view of a portion of the same, on an enlarged scale.

Fig. 3 is a plan view on a further enlarged scale of a portion of the same.

Fig. 4 is a side elevation of a modified form of my improved anti-skidding device and on the same scale as Fig. 1.

Fig. 5 is a similar view on the same scale as Fig. 2 of a portion of the same.

My improved anti-skidding device comprises a pair of side frames of circular form for being positioned alongside the wheel 11 and a plurality of cross-connecting devices that bridge the said side frames 10 at intervals, the same passing over the periphery of the tire and serving as the anti-skidding devices proper.

The frames 10 comprise each as shown in Fig. 1 a single piece of heavy wire bent into circular form, formed into outwardly directed loops 13 at intervals corresponding to the positions desired for the bridges 12, and having at the ends means for connecting and disconnecting. As shown the said means comprise a snap hook 14 connected to one end and a terminal ring 15 for being connected to the said hook 14 on the other end.

The said frame as mentioned is made of heavy wire, being made of a single piece, and is appreciably rigid.

The cross-connecting devices or bridges are provided with hooks 16 at the inner ends for hooking into eyes 13 and are each formed of a pair of similar parts 12 that are permanently connected together at the outer ends, at the position of the middle of the periphery of the tire 20, by means of interconnected terminal loops 17.

I prefer to form the said parts 12 as shown of a single piece of wire, bent back upon itself at about the middle portion to form the terminal loop 17. The arms of the loop are brought back together to form a shank 18 and the free end of one of the arms is bent to form the hook 16.

The free end 19 of the other arm terminates adjacent the free end of the said hook 16.

The two arms where they unite to form the shank 18 are twisted together, as shown, and the shank 18 as a whole is bent into arch shape to fit the curvature of the tire 20.

Because the two arms of the loop 17 that compose the shank 18 are twisted together as described the said loops 17 are closed permanently, the pair of mating parts 12 that have the loops 17 interengaged being permanently connected together.

The parts are formed of heavy wire, being quite rigid, and the connection for the two parts formed by interconnecting the terminal loops 17, provides all the flexibility that is required, the said connection serving as a hinge connection.

It will be noted that in the construction described the large number of open loops that are found in a chain device is avoided, such loops being ojectionable on account of their filling with dirt and road material.

Also, because of the rigidity of the frames the objectionable whipping or loose play that is found with chain devices is avoided.

Also because of the rigidity of the frame the device is more easily handled in applying the same to the tire and removing the same, because of the small number of loosely connected parts.

The same advantages described are found generally in the modification shown in Figs. 4 and 5, which differs from the style shown in Fig. 1 in that the frame is made of a plurality of sections $10^a$, as shown, four in number, the intermediate sections $10^a$ being flexibly interconnected in any suitable manner, as by means of rings 22 of wire connected to eyes 23 formed in the ends of the sections $10^a$. The end sections $10^a$ are separably connected by means of the snap hook 14 as in the style shown in Fig. 1.

The sections $10^a$ are made of about the same length and the flexible connection provided by means of the rings 22 permits of folding the sections $10^a$ together in compact form when not in use.

It is apparent that some changes from the specific construction herein disclosed may be made and therefore I do not wish to be understood as limiting myself to the precise form of construction shown and described, but desire the liberty to make such changes, in working my invention, as may fairly come within the spirit and scope of the same.

I claim as my invention:—

In an anti-skidding device for automobile tires comprising a pair of slide frames interconnected by a plurality of bridges, the said bridges being composed of a pair of similar parts, formed of wire, and each of the said parts comprising a loop at one end for engaging with the corresponding loop on the mating part and an eye at the other end for engaging with the said frame, and the portion intermediate the said ends being in the form of a shank, formed of two adjacent portions of the said wire, the said two adjacent portions being twisted together.

NAPOLEON RINFRETT.

Witnesses:
   Geo. A. Stark,
   Louis M. Schmidt.